Dec. 20, 1932.  A. C. HAYDEN  1,891,262
MOTION PICTURE CAMERA
Filed Feb. 20, 1929  3 Sheets-Sheet 1
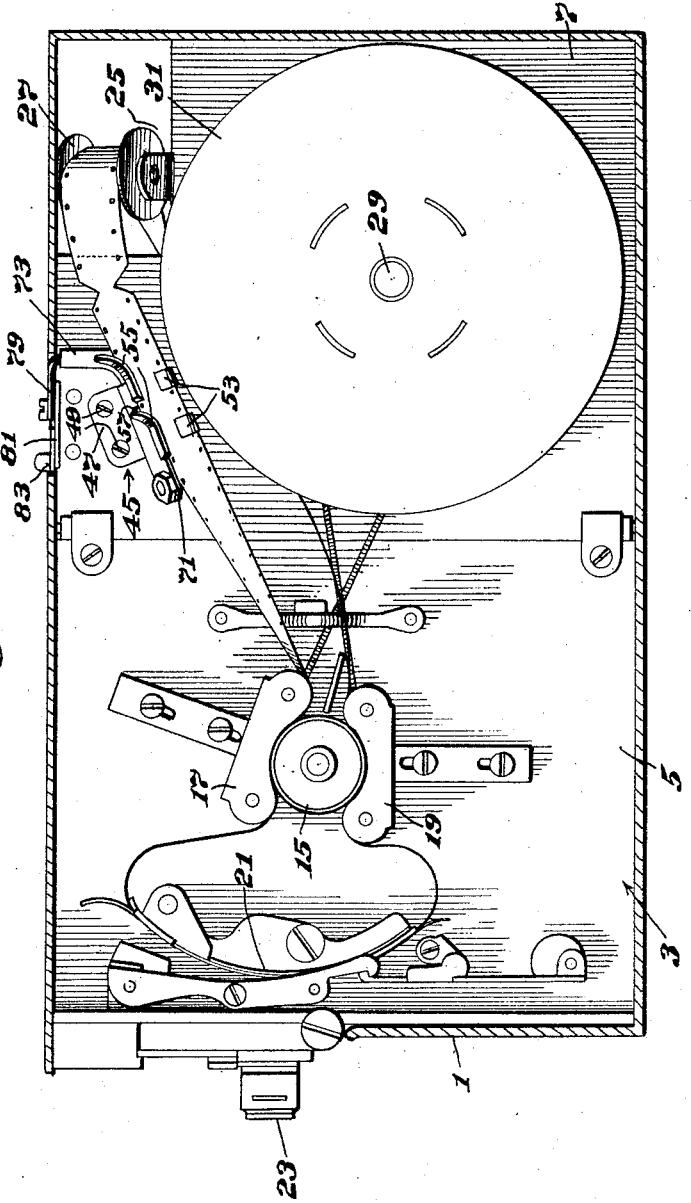
INVENTOR:
Arthur C. Hayden
BY Henry T. Williams,
ATTORNEY Dec. 20, 1932.    A. C. HAYDEN    1,891,262
MOTION PICTURE CAMERA
Filed Feb. 20, 1929    3 Sheets-Sheet 2
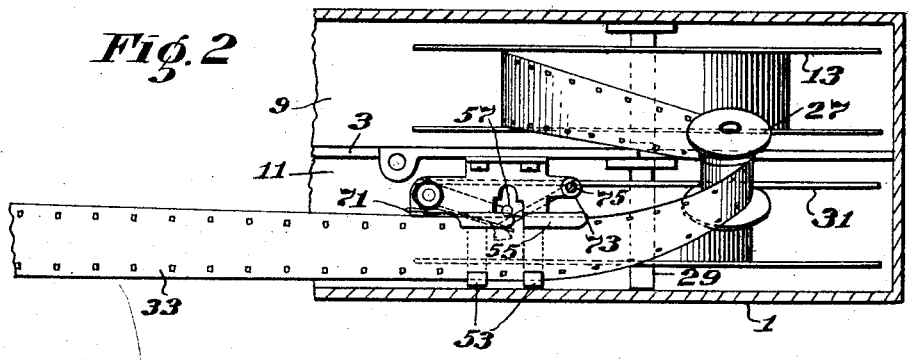
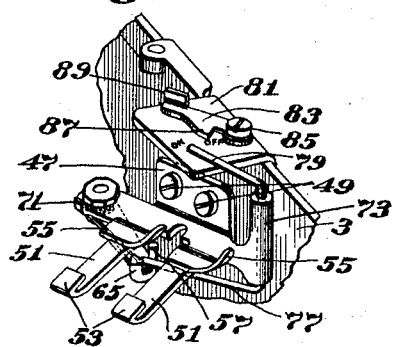
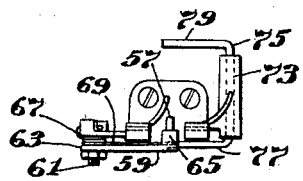
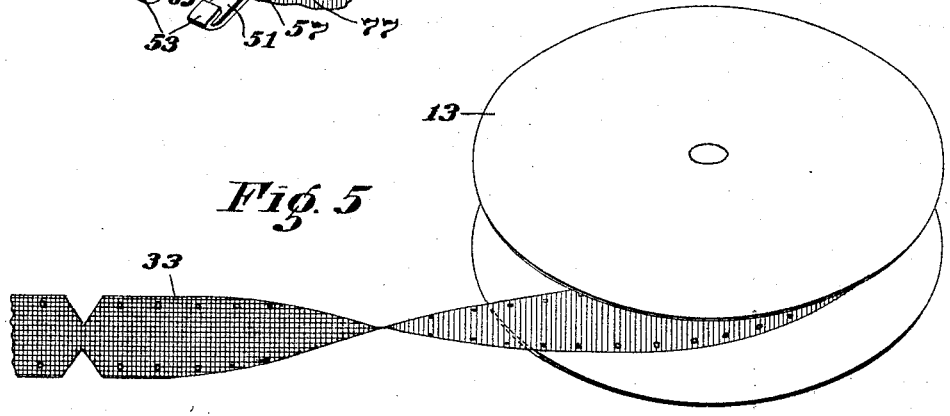
INVENTOR:
Arthur C. Hayden
BY Henry T. Williams,
ATTORNEY Dec. 20, 1932.  A. C. HAYDEN  1,891,262
MOTION PICTURE CAMERA
Filed Feb. 20, 1929  3 Sheets-Sheet 3
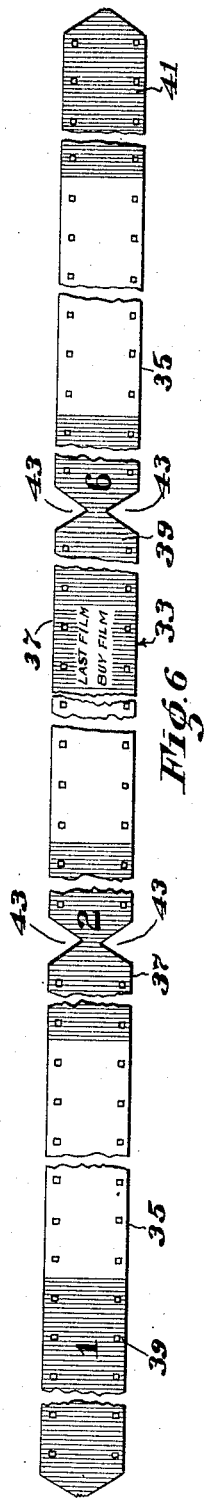
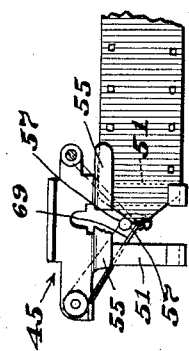
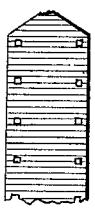
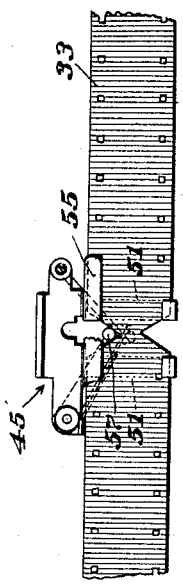
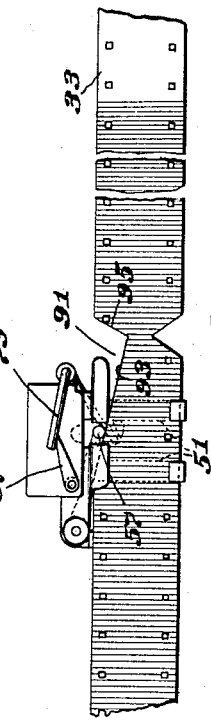
INVENTOR:
Arthur C. Hayden
BY Henry T. Williams,
ATTORNEY Patented Dec. 20, 1932

1,891,262

UNITED STATES PATENT OFFICE

ARTHUR C. HAYDEN, OF BROCKTON, MASSACHUSETTS

MOTION PICTURE CAMERA

Application filed February 20, 1929. Serial No. 341,421.

The invention to be hereinafter described relates to motion picture cameras.

Heretofore in cameras it has been customary to use film spools, each with 100 feet of film thereon. This film is expensive and therefore economy in its use is essential. Many times it is desirable to develop short lengths of film soon after pictures have been taken, in order that the pictures may be projected and seen promptly thereafter, but heretofore it has been necessary to postpone development of the negatives and projection of the pictures until the entire length of film has been exposed.

A purpose of the present invention, therefore, is to provide a magazine film spool which will have a continuous ribbon wound thereon comprising alternating film stretches and leaders, the latter being sufficiently long to prevent light reaching the film stretches on the let-off and take-up spools and while the camera is open and exposed to light in inserting spools into and removing spools from the camera. Another purpose is to provide the camera with means automatically to arrest feed of film from the let-off spool after each stretch of film has been wound on the take-up spool. The leader between film stretches may be automatically severed midway between the ends thereof to allow the film feed means to wind the trailing covering leader on the take-up spool.

In carrying the invention into practical effect, in the present instance the leaders may have marginal notches, and a feeler device may be provided for engagement with edges of the film and leaders in the course of their run from spool to spool in the camera, the construction being such that the feeler will automatically enter a notch on registration of the latter with the feeler, thereby positively to arrest a portion of a leader advancing from the let-off spool, the pull on the film by the film feed means operating to break or sever the leader at the feeler.

By simple, externally accessible adjustments, the camera may operate to sever the leaders or not, at the will of the operator, and means may be provided for indicating the adjustments.

The character of the invention may be best understood by reference to the following description of one good form thereof shown in the accompanying drawings, wherein:

Fig. 1 is a vertical longitudinal section through a motion picture camera;

Fig. 2 is a horizontal section through a rear portion of the camera;

Fig. 3 is a perspective view of the feeler film interrupter device;

Fig. 4 is an elevation of said device;

Fig. 5 is a perspective view of one of the spools and a portion of the film and leader ribbon;

Fig. 6 is a view of the film and leader ribbon, portions being broken away;

Fig. 7 is a view showing a marginal notch of a leader in registration with the feeler;

Fig. 8 is a view similar to Fig. 7 showing end portions of the severed leader; and Fig. 9 is a view of a ribbon having a wide notch.

Referring to the drawings, the motion picture camera shown therein, comprises a casing 1 (Figs. 1 and 2) having a vertical partition 3 between opposite sides of the box including a fixed plate 5 and a hinged plate 7. This partition divides the box into two chambers 9 and 11, the former containing the usual film feed spring motor, gear trains, and the let-off spool 13, this spool being mounted on a spindle back of the hinged plate which may be rocked laterally to allow insertion of let-off spools on said spindle and their removal therefrom.

The other chamber contains a film feed sprocket wheel 15, and guide rollers on adjustable carriers 17 and 19 and adapted to hold the film in proper feed relation with respect to the sprocket wheel. Located forwardly of the sprocket wheel is the frame 21 for guiding the film in its transit past the camera lens 23.

Located in an aperture 25 in the partition is a guide roller 27. A spindle 29 is mounted on the hinged plate 7 referred to, and is adapted to receive the take-up spool 31.

The parts of the camera thus far described may be of usual well-known construction, and therefore, it is unnecessary to describe them in further detail herein.

Instead of the usual continuous film, a ribbon 33 (Figs. 5 and 6) is provided having sprocket feed holes along the margins thereof and comprising alternate film stretches 35 and opaque leaders 37, an advance leader 39 being at one end of the ribbon, and a trailing leader 41 being at the opposite end of the ribbon. These leaders are black on one side and may be red on the opposite side. The film stretches and leaders are in sections connected together in end-to-end relation. The leaders in the ribbon intermediate the end leaders may have marginal notches 43 therein preferably midway between the ends of each leader and serving locally to weaken the same that they may be readily broken by means which will now be described.

This means, in the present instance, is in the form of a feeler device 45 comprising a bracket 47 located in the chamber 11 and attached by screws 49 to the partition 3. This bracket has a pair of arms 51 projecting therefrom with reversely bent lips 53. The bracket also has a pair of upwardly curved fingers 55 extending transversely to the arms 51 and spaced slightly above the same.

Located in the space between the arms 51 is a feeler 57 in the form of a pin projecting upward from a rock arm 59 pivotally mounted on a bolt 61 carried by an extension 63 of the bracket. The rock arm has a lug 65 spaced from and opposite to the feeler pin 57. A coil spring 67 encircles the shank of the bolt 61, and has an end portion 69 engaging the lug 65 and its opposite end portion engaging a lug 71 on the bracket extension 63. This spring tends to rock the arm 59 in a clockwise direction (Fig. 3) until limited by engagement of the lug 65 with the left arm 51.

The bracket has a hollow bearing post 73 in which is a shaft 75 having a crank 77 at the lower end thereof with its end projecting in between the feeler pin 57 and the lug 65. At the upper end of the shaft is a handle 79 which projects above the top of the camera casing where it is accessible for manual adjustment.

Mounted on the partition above the bracket is a shelf plate 81 over which the handle 79 extends. To hold the handle 79 in one of its positions of adjustment, a lock lever 83 is pivotally mounted on a screw 85 on the shelf plate, said lever being provided with a shoulder 87 and a handle 89. When the handle 79 is rocked toward the screw 85, the lock lever 83 may be turned in a contra-clockwise direction so that its shoulder 87 will engage the handle 79 and hold the latter in the position to which it is adjusted. The shelf plate may be marked with the words "On" and "Off" to show the positions of adjustment of the handle 79.

Leaders in advance of the film stretches may be marked with numbers in numerical order, so that the operator may be informed the number of film sections remaining on the let-off spool, and the leader for the last film stretch may be marked "Last Film Buy Film" as a warning that the film of the let-off speed is about to be exhausted.

In operation, the film and leader ribbon will be threaded from the let-off spool over the roller 27 and thence over the bracket arms 51 and beneath the lips 53 and the fingers 55, the upwardly curved ends of the latter serving to facilitate threading of the film over the bracket. The film is conducted thence over the sprocket wheel 15, through the guide frame 21, and thence back beneath the sprocket wheel and to the take-up spool. The bracket fingers and lips will prevent transverse buckling of the film.

The camera is now closed and is in readiness to have the ribbon fed therein. The spring motor is rendered effective by the usual control to feed the ribbon. After feeding, exposing a film stretch and winding the same on the take-up spool, and winding a portion of a following leader on said spool, one of the marginal notches of the leader will arrive in registration with the feeler pin 57 (Fig. 7), and then the spring 67 will become effective to rock the arm 59 and snap the feeler into said notch. This will positively interrupt further feed of the leader portion extending from the let-off spool to the feeler. Continued rotation of the film feed sprocket wheel 15 will sever or break the leader, as will be noted in Fig. 8. The portion of the leader between the feeler and the take-up spool will continue to be fed until wound thereon.

Then the take-up spool with the film stretch and its covering leader thereon can be removed from the camera to permit the film stretch to be promptly developed. When it is desired to take photographs on the next following film stretch, the leader portion standing at the feeler device may be threaded to the take-up spool in the usual manner, and the operation can be repeated as above described. The feeler interrupter device may be located between the sprocket wheel and the take-up spool if desired. This will avoid threading a leader through the guide frame 21 after each film stretch is wound on the take-up spool.

Under certain conditions it may be desirable to arrest feed of the film without severing the leader. To accomplish this, the film preferably has marginal notches 91 (Fig. 9) having a long edge 93 and a short edge 95. This notch will allow the feeler gradually to approach the deepest point of the notch. The shelf may have a pointer 97 pivotally mounted thereon and with a friction sufficient to cause it to tend to stand in the positions to which it is adjusted. The relation of this indicator to the handle 79 is such that on initial movement of the feeler into the notch 91, the handle will move the indicator somewhat. This may be readily observed by the operator and allow him sufficient time to stop the film feed motor before the feeler is engaged by the short edge 95 of the notch. Since the leader will not be severed until the short edge of the notch 95 reaches the feeler, and the feed ceases before said edge reaches the feeler, severing the film is avoided. When the handle 79 is adjusted to move the feeler back into position for engagement with the edge of the ribbon, the pointer 97 may be manually moved back into engagement with the handle where it will be in readiness to be rocked by the handle the next time the feeler commences to move into a notch such as indicated at 91.

There are many advantages in providing the motion picture camera with magazine film spools. Portions of the length of the film on a spool may be separately removed, developed and promptly projected without the frequently objectionable delay due to waiting for pictures to be taken on the entire length of film on the spool. The magazine film spool may be of the same size as the spool now commonly used for 100 feet of continuous film, but the ribbon on the spool will comprise five film stretches, each 10 feet in length, an advance leader, a trailing leader and four leaders between the film stretches. This magazine spool will eliminate the necessity for five individual spools and boxes therefor, and it will enable economy of space since one magazine spool carrying 100 feet of film and leaders will occupy less space than five spools, each carrying 10 feet of film. An expensive laboratory with complicated apparatus and skilled labor are required to handle and develop 100 feet of continuous film, whereas 10 feet of film can be easily handled and developed in the home by the amateur with simple, cheap apparatus.

In making titles for motion pictures the magazine film spool would be useful, convenient and economical, since 10 feet of film is about the proper length of an usual title. Also, this spool would be appreciated by the camera man engaged in photographing news picture, as separate ten foot lengths can be removed in daylight and promptly sent to the developing laboratory. He will be prepared to protograph any short events where he would not care to feed 100 feet of film through the camera.

It will be understood that the invention is not limited to the specific embodiment shown, and that various deviations may be made therefrom without departing from the spirit and scope of the appended claims.

What is claimed is:

1. In a motion picture camera, the combination of take-up and let-off spools, a ribbon having sprocket feed holes along the margins thereof and comprising alternating film stretches and opaque leaders, said stretches and leaders being in sections connected in end-to-end relation, said leaders having marginal notches therein, means including sprocket wheels for feeding the ribbon from the let-off to the take-up spool, a guide for the ribbon, and a device having a feeler adapted automatically to enter the notches positively to interrupt feed of a portion of the ribbon and cause automatic breaking of a leader by continued operation of the ribbon feeding means.

2. In a motion picture camera, the combination of take-up and let-off spools, a ribbon having sprocket feed holes along the margins thereof and comprising alternating film stretches and opaque leaders, said film stretches and leaders being in sections connected in end-to-end relation, means including sprocket wheels for feeding the ribbon from the let-off to the take-up spool, and means cooperating with the feeding means automatically to break a leader after a film stretch and a portion of a leader have been wound on the take-up spool.

3. In a motion picture camera, the combination of take-up and let-off spools, a ribbon having sprocket feed holes along the margins thereof and comprising alternating film stretches and opaque leaders, said film stretches and leaders being in sections connected in end-to-end relation, means cooperating with said feed holes for feeding the ribbon, and means automatically to break a leader after a film stretch has been wound on the take-up spool.

4. In a motion picture camera, the combination of take-up and let-off spools, a ribbon having sprocket feed holes along the margins thereof and comprising alternating film stretches and opaque leaders, said film stretches and leaders being in sections connected in end-to-end relation, means cooperating with said feed holes for feeding the ribbon, and means for breaking the leaders intermediate the ends thereof, said leaders having provision for rendering the breaking means effective after a predetermined length of the ribbon has been wound on the take-up spool.

5. In a motion picture camera, the combination of take-up and let-off spools, a ribbon having sprocket feed holes along the margins thereof and comprising alternating film stretches, and opaque leaders having marginal notches, said film stretches and leaders being in sections connected in end-to-end relation; means including sprocket wheels for feeding the ribbon from the let-off to the take-up spool, a guide for the ribbon having provision to prevent transverse buckling of the ribbon, and a feeler at the guide adapted to engage an edge of the ribbon and enter the leader notches for severing of the leaders at the notches by the ribbon feed means.

6. In a motion picture camera, the combination of take-up and let-off spools, a ribbon having sprocket feed holes along the margins thereof and comprising alternating film stretches, and opaque leaders having marginal notches, said film stretches and leaders being in sections connected in end-to-end relation; means for feeding the ribbon, a feeler, and spring means urging the feeler against an edge of the ribbon and adapted to move the feeler into the notches on their registering therewith, that the leaders may be severed by the film feed means.

7. In a motion picture camera, the combination of take-up and let-off spools, a ribbon having sprocket feed holes along the margins thereof and comprising alternating film stretches, and opaque leaders having marginal notches, said film stretches and leaders being in sections connected in end-to-end relation; a feeler adapted to engage an edge of the film and enter the notches, means to feed the film from the let-off to the take-up spool and break the leaders on entrance of the feeler into the notches, and adjustable means for preventing the feeler from entering the notches.

8. In a motion picture camera, the combination of take-up and let-off spools, a ribbon having sprocket feed holes along the margins thereof and comprising alternating film stretches, and opaque leaders having marginal notches, said film stretches and leaders being in sections connected in end-to-end relation; a feeler adapted to engage an edge of the film and enter the notches, means to feed the film from the let-off to the take-up spool and break the leaders on entrance of the feeler into the notches, the feeler being adjustable to operative and inoperative positions, and means for indicating the positions of the feeler.

9. In a motion picture camera, the combination of take-up and let-off spools, a ribbon having sprocket feed holes along the margins thereof and comprising alternating film stretches, and opaque leaders having marginal notches, said film stretches and leaders being in sections connected in end-to-end relation; means for feeding the ribbon from the let-off to the take-up spool, a feeler, means urging the feeler toward an edge of the ribbon, and a pointer adapted to be moved by the feeler to indicate initial movement of the feeler into the notches.

ARTHUR C. HAYDEN.